US010635748B2

(12) United States Patent
Liu et al.

(10) Patent No.: US 10,635,748 B2
(45) Date of Patent: Apr. 28, 2020

(54) COGNITIVE AUTO-FILL CONTENT RECOMMENDATION

(71) Applicant: INTERNATIONAL BUSINESS MACHINES CORPORATION, Armonk, NY (US)

(72) Inventors: Su Liu, Austin, TX (US); Jeff Calcaterra, Chapel Hill, NC (US); Qin Qiong Zhang, Beijing (CN); Cheng Xu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/842,208

(22) Filed: Dec. 14, 2017

(65) Prior Publication Data

US 2019/0188251 A1    Jun. 20, 2019

(51) Int. Cl.
| | | |
|---|---|---|
| G06F 17/00 | (2019.01) |
| G06F 17/24 | (2006.01) |
| G06F 3/048 | (2013.01) |
| G06F 17/27 | (2006.01) |
| G06F 16/335 | (2019.01) |
| G06F 16/9532 | (2019.01) |

(52) U.S. Cl.
CPC ............ *G06F 17/243* (2013.01); *G06F 3/048* (2013.01); *G06F 16/337* (2019.01); *G06F 16/9532* (2019.01); *G06F 17/276* (2013.01); *G06F 17/278* (2013.01)

(58) Field of Classification Search
CPC .... G06F 17/243; G06F 17/276; G06F 17/178; G06F 16/337; G06F 3/048; G06F 17/278
See application file for complete search history.

(56) References Cited

U.S. PATENT DOCUMENTS

| | | | | |
|---|---|---|---|---|
| 9,282,202 | B2* | 3/2016 | Gowen | G06F 3/1242 |
| 9,413,906 | B2* | 8/2016 | Shlimovich | G06F 3/1242 |
| 2005/0120052 | A1* | 6/2005 | Miller | G06Q 10/00 |
| 2005/0257148 | A1* | 11/2005 | Goodman | G06F 17/243 |
| | | | | 715/226 |
| 2007/0016563 | A1* | 1/2007 | Omoigui | G06F 16/36 |
| 2007/0240100 | A1* | 10/2007 | Hammerich | G06F 9/44505 |
| | | | | 717/104 |
| 2007/0256005 | A1* | 11/2007 | Schneider | G06F 17/2235 |
| 2008/0120390 | A1* | 5/2008 | Robinson | A63F 13/12 |
| | | | | 709/207 |
| 2008/0267505 | A1* | 10/2008 | Dabet | G06F 17/243 |
| | | | | 382/181 |

(Continued)

FOREIGN PATENT DOCUMENTS

| | | |
|---|---|---|
| WO | 2016028620 A1 | 2/2016 |
| WO | 2016153463 A1 | 9/2016 |

*Primary Examiner* — Laurie A Ries
(74) *Attorney, Agent, or Firm* — Griffiths & Seaton PLLC

(57) ABSTRACT

Embodiments for cognitively recommending auto-fill content by a processor. Communications generated from one or more applications or devices may be tracked. Auto-fill content extracted from the communications may be recommended to automatically fill into a target application. User reaction to the auto-fill content may be learned to refine user-interaction patterns on the target application or the one or more applications or devices.

20 Claims, 9 Drawing Sheets

(56) References Cited

U.S. PATENT DOCUMENTS

| | | | |
|---|---|---|---|
| 2010/0114715 A1* | 5/2010 | Schuster | G06Q 30/02 705/14.69 |
| 2011/0021250 A1* | 1/2011 | Ickman | G06F 17/30867 455/566 |
| 2011/0055309 A1* | 3/2011 | Gibor | G06Q 30/02 709/202 |
| 2012/0278164 A1* | 11/2012 | Spivack | G06Q 10/10 705/14.52 |
| 2012/0296991 A1* | 11/2012 | Spivack | G06Q 10/10 709/206 |
| 2012/0311139 A1* | 12/2012 | Brave | G06F 16/9535 709/224 |
| 2013/0124529 A1* | 5/2013 | Jacob | G06F 9/44505 707/740 |
| 2013/0151240 A1* | 6/2013 | Myslinski | G06F 17/20 704/9 |
| 2013/0317808 A1* | 11/2013 | Kruel | H04L 51/32 704/9 |
| 2014/0095586 A1* | 4/2014 | Grosz | G06F 3/1242 709/203 |
| 2015/0339570 A1* | 11/2015 | Scheffler | G06N 3/10 706/16 |
| 2016/0180240 A1* | 6/2016 | Majumdar | G06N 3/006 706/46 |
| 2016/0217119 A1* | 7/2016 | Dakin | G06F 17/276 |
| 2016/0224524 A1* | 8/2016 | Kay | G06F 16/252 |
| 2016/0357858 A1* | 12/2016 | Ghani | G06Q 50/01 |
| 2016/0359914 A1* | 12/2016 | Deen | H04L 63/1425 |
| 2016/0378743 A1* | 12/2016 | Kumar | G06F 17/243 715/780 |
| 2017/0052983 A1* | 2/2017 | Pearlman | G06K 9/46 |
| 2017/0250930 A1* | 8/2017 | Ben-Itzhak | G06F 3/0488 |
| 2017/0329466 A1* | 11/2017 | Krenkler | G06F 9/453 |
| 2018/0060372 A1* | 3/2018 | Roh | H04W 4/00 |
| 2018/0129657 A1* | 5/2018 | Guest | G06F 3/04842 |
| 2018/0359107 A1* | 12/2018 | Asher | G06K 9/3266 |

* cited by examiner

COGNITIVE AUTO-FILL CONTENT RECOMMENDATION

BACKGROUND OF THE INVENTION

Field of the Invention

The present invention relates in general to computing systems, and more particularly to, various embodiments for cognitively recommending auto-fill content between different applications or devices by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. Smartphones and other sophisticated devices that rest in the palm of a person's hand allow for the sharing of information between users in an increasingly user friendly and simple manner. The increasing complexity of society, coupled with the evolution of technology continue to engender the sharing of a vast amount of information between people.

SUMMARY OF THE INVENTION

Various embodiments for cognitively recommending auto-fill content by a processor, are provided. In one embodiment, by way of example only, a method for cognitively recommending auto-fill content between different applications or devices, again by a processor, is provided. Auto-fill content extracted from the communications may be recommended to automatically fill into a target application. User reaction to the auto-fill content may be learned to refine user-interaction patterns on the target application or the one or more applications or devices.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
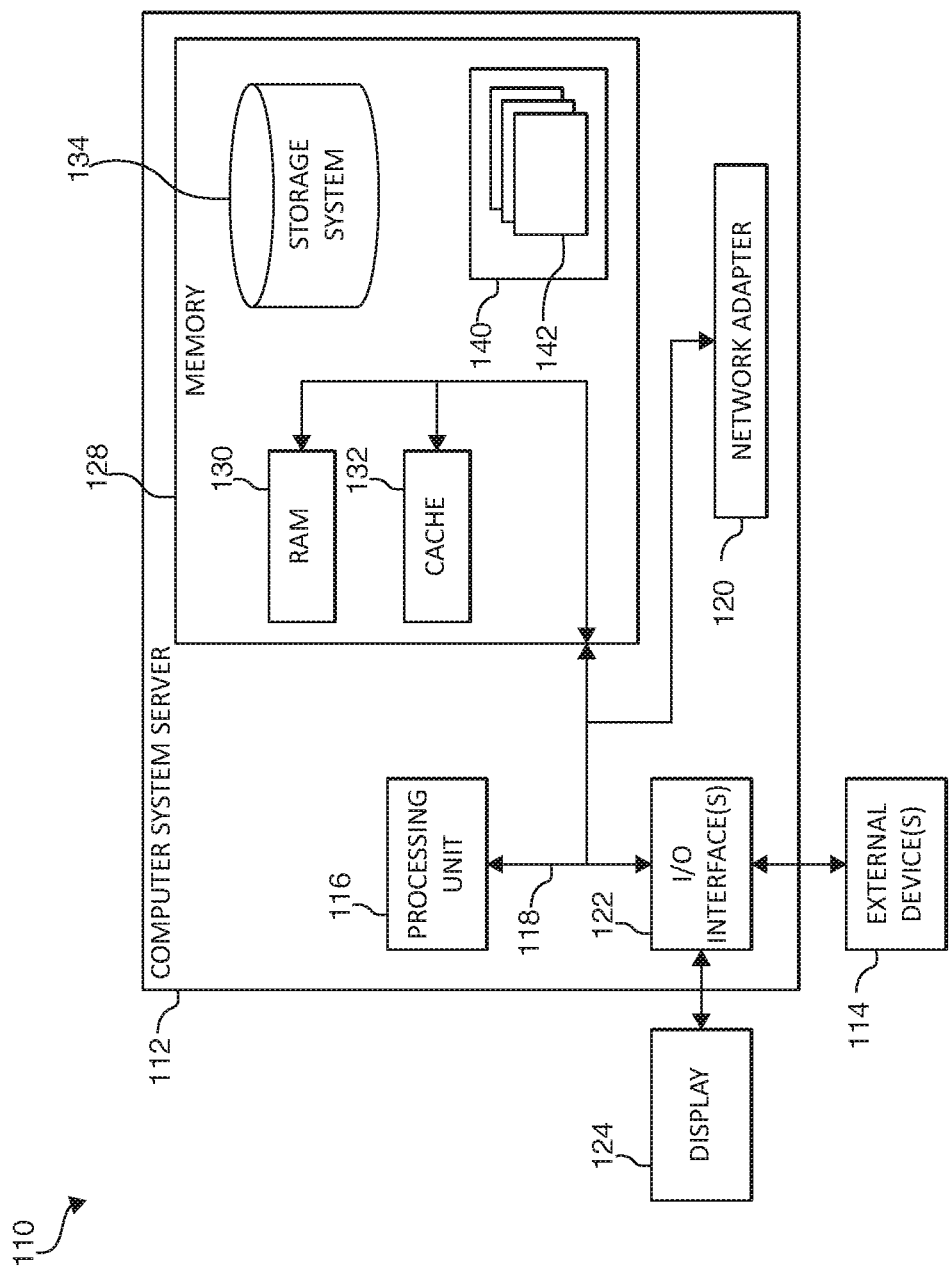
FIG. 1 is a block diagram depicting an exemplary cloud computing node according to an embodiment of the present invention.

With the advent of immediate, real-time communication made possible by smartphones and other devices, computing systems and applications may include a graphical user interface (GUI) type of display format that enables a data processing system user to choose commands, start programs, and see graphical and textual information generated by applications by pointing to pictorial representations (icons) and lists of menu items on the screen. Entering text and other input using computing devices can be time consuming. Also, erroneous keystrokes on a physical or virtual keyboard may need to be corrected, further complicating the entry of input. Autofill or autocomplete suggestions may be provided to assist in entering all or portions of text to a computing device or to fill out commonly-entered information into a text field. The auto completed content information may be, for example, a full name of a user, email or postal address, or credit card information.

Given the vast prolific use of smartphones, tablets, personal computers, and even internet of things (IoT) devices enabling users to seamlessly and efficiently communicate with each other, it is common to have multiple applications operating simultaneously on a computing device and copy contents from one application to another application. Currently, however, it is extremely difficult, if not impossible, to automatically identify and collect useful or important information (e.g., from a user's perspective) from one application to a target application that may be operating on the same or an entirely different device.

Accordingly, various embodiments described herein provide for cognitively recommending auto-fill content between different applications or devices. Auto-fill content may be extracted from one or more communications (e.g., emails, phone call, oral conversation, electronic communications, audio data, video data, etc.) and may be recommended to automatically fill into a target application. User reaction to the auto-fill content may be learned to refine user-interaction patterns on the target application or the one or more applications or devices. The present invention provides a proactive and comprehensive auto-fill operation to instantly identify, recommend, and auto-fill information from a first application to a second or "target" application. Thus, the present invention provides proactive auto-filling to enable users to share and transfer information across multiple applications during run time. Furthermore, the present invention enables contents of an autocomplete buffer operation to be updated during the communication. The content in an autocomplete buffer may also be automatically extracted or divided into multiple fields so as to populate one or more fields in the target application.

The mechanisms of the illustrated embodiments provide a proactive, automatic filling operation based on learning, in real time, user-screen interaction for enhancing auto-copy and fill service crossing different applications and devices. Users may then be enabled to receive runtime assistance to automatically fill out requested text fields in the different applications and/or devices. Said differently, the present invention provides for automatically extracting content of a recorded message (such as screenshot) to be automatically filled ("auto-fill") into a target application. Additionally, the present invention provides for automatically merging multiple communication messages into auto-fill content for auto-filling into a target application.

In one aspect, multiple communications (e.g., conversations) and the contexts of the communications may be tracked from multiple resources or data sources (e.g., email, phone call, oral conversation, short mail service ("SMS") messages, voice data/messages, and video chatting threads, channels, protocols, and formats) on different applications and/or devices (includes IoT devices). Buffered contents may be buffered and divided into separate useful pieces of information. Selected context keywords may be extracted (e.g., time, names, events, subjects, object, etc.). Chronological and logic orders for correlated events (may be saved in a cloud for serving multiple devices) may be updated and synchronized. User-screen interaction operations may be analyzed on a running session of active applications. User-screen interaction patterns may be created. For example, user-screen interaction patterns can be monitored, learned, updated, and/or purified by a system. For instance, assume a person asked user A to send a manager email address and phone number of person named "Peter" in APP1. The user A may switch APP1 to a web browser and open a company human resource "HR" page, may search Peter's information, may copy Peter's email address, then switch screens back to APP1, and then paste Peter's email address and send Peter's email address to the requester. Then, a User-Screen interaction pattern can be monitored and generated as follows: need <User> email address→ in <APP1>; launch/check HR page <APP2>; cope <USER> Email address, switch back to <APP1>, auto-fill <USER> email info to <REQUESTER>.

One or more potential filling objects or inputs (e.g., typehead, a list of potential responses, or other selected objects or inputs) in a target application or device may be located and identified. A recommendation candidate list for auto-fill content may be generated. All or portions of the auto-fill candidate list may be automatically filled into the located objects or input fields. The present invention may accept all or selected portions of the auto-fill content to fill out the correlated fields. User reaction and feedback may be learned. Also, user-screen interaction patterns may be refined across the different applications or devices, such as, for example, a refined user-screen interaction for copying a Chinese name using the Chinese culture convention of the name order is: Last Name First Name, which is opposite to English culture convention. In device-1, if a correction is made to a name order in an auto-fill operation in device-1, then the pattern may be remembered and saved in the device-1. The refined operation can be done in device-I, where "I" is an ith device number. In one aspect, the different applications may have different interaction patterns on different devices similar to the manner in which a dropdown menu appears different on a mobile device and desktop.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 110 is only one example of a suitable cloud computing node and is not intended to suggest any limitation as to the scope of use or functionality of embodiments of the invention described herein. Regardless, cloud computing node is capable of being implemented and/or performing any of the functionality set forth hereinabove.

In cloud computing node 110 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node is shown in the form of a general-purpose computing device. The components of computer system/ server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 128 may include at least one program product having a set (e.g., at least one) of program modules that are configured to carry out the functions of embodiments of the invention.

Program/utility 140, having a set (at least one) of program modules 142, may be stored in system memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

Computer system/server 112 may also communicate with one or more external devices 14 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via Input/Output (I/O) interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 2:
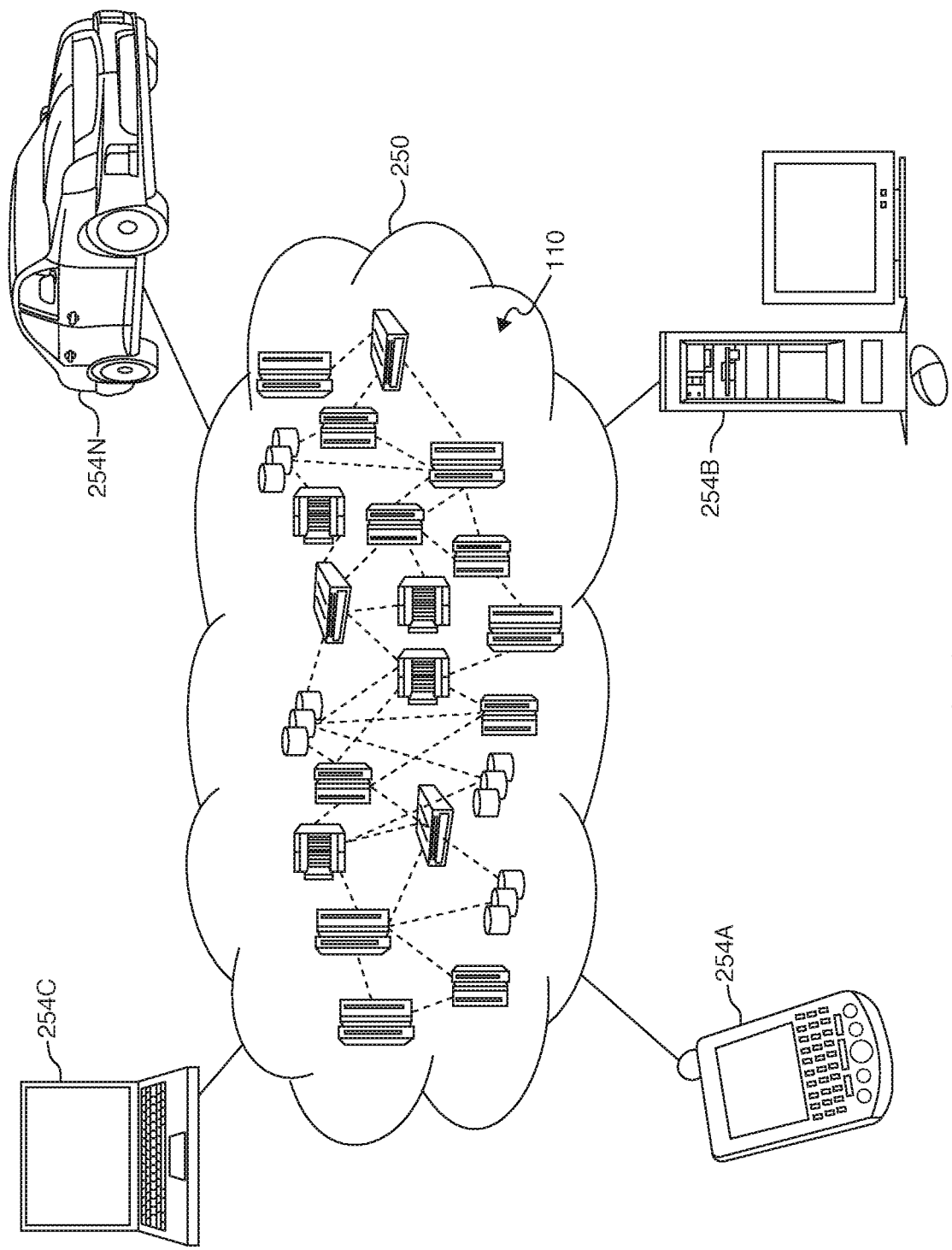
FIG. 2 is an additional block diagram depicting an exemplary cloud computing environment according to an embodiment of the present invention.

Referring now to FIG. 2, illustrative cloud computing environment 50 is depicted. As shown, cloud computing environment 250 comprises one or more cloud computing nodes with which local computing devices used by cloud consumers, such as, for example, personal digital assistant (PDA) or cellular telephone 254A, desktop computer 254B, laptop computer 254C, and/or automobile computer system 254N may communicate. Nodes may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes and cloud computing environment 250 can communicate with any type of computerized device over any type of network and/or network addressable connection (e.g., using a web browser).

Figure 3:
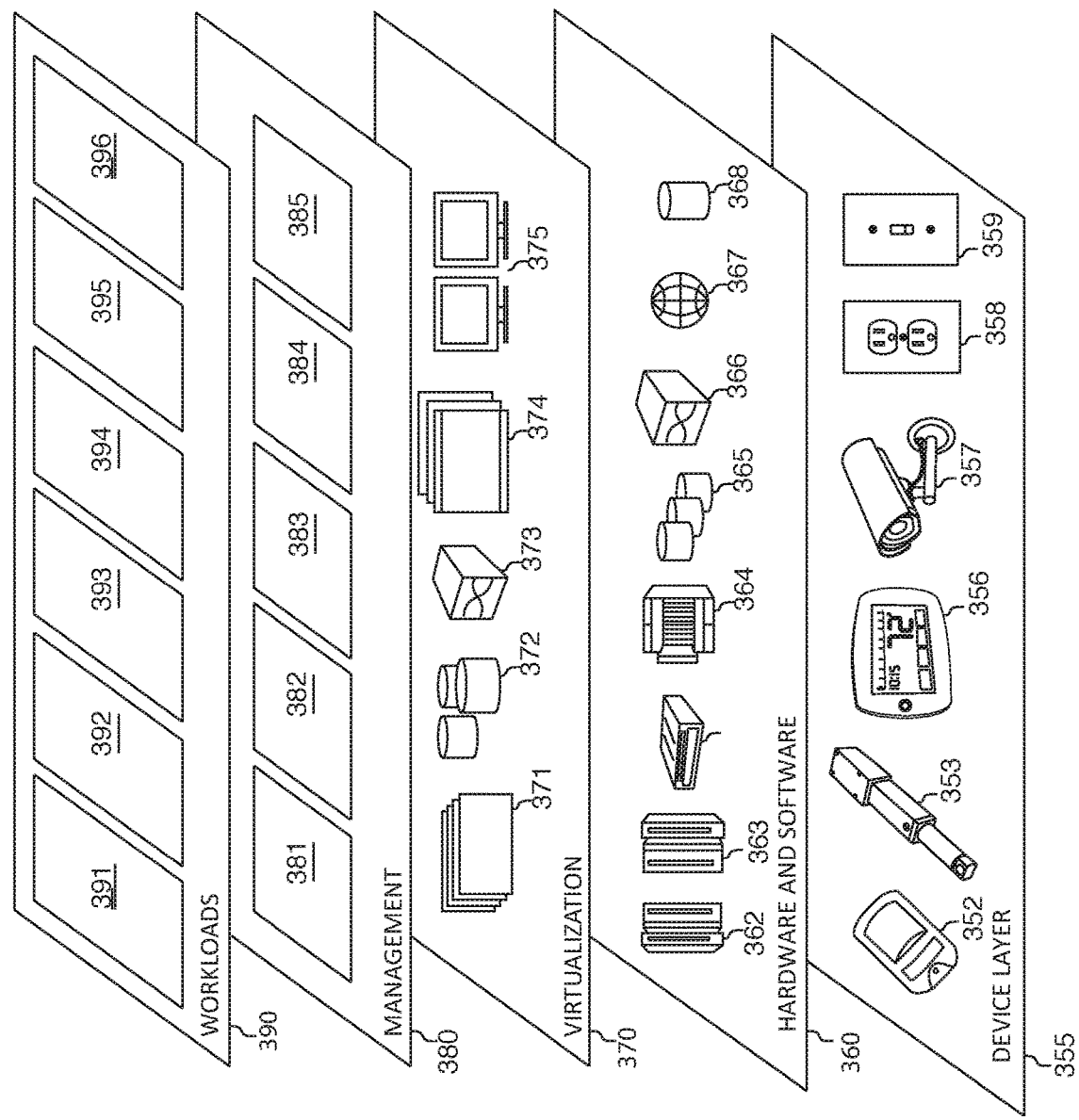
FIG. 3 is an additional block diagram depicting abstraction model layers according to an embodiment of the present invention.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 355 includes physical and/or virtual devices, embedded with and/or standalone electronics, sensors, actuators, and other objects to perform various tasks in a cloud computing environment 250. Each of the devices in the device layer 355 incorporates networking capability to other functional abstraction layers such that information obtained from the devices may be provided thereto, and/or information from the other abstraction layers may be provided to the devices. In one embodiment, the various devices inclusive of the device layer 355 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 355 as shown includes sensor 352, actuator 353, "learning" thermostat 356 with integrated processing, sensor, and networking electronics, camera 357, controllable household outlet/receptacle 358, and controllable electrical switch 359 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provides pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and, in the context of the illustrated embodiments of the present invention, various cognitive auto-fill content recommendation workloads and functions 396. In addition, cognitive auto-fill content recommendation workloads and functions 396 may include such operations as data analytics, data analysis, and as will be further described, notification functionality. One of ordinary skill in the art will appreciate that the cognitive auto-fill content recommendation workloads and functions 396 may also work in conjunction with other portions of the various abstractions layers, such as those in hardware and software 360, virtualization 370, management 380, and other workloads 390 (such as data analytics processing 394, for example) to accomplish the various purposes of the illustrated embodiments of the present invention.

As previously mentioned, the mechanisms of the illustrated embodiments provide novel approaches for tracking communications and the context of the communications from multiple data sources (e.g., emails, text messages, etc.) on different applications or devices. An auto-fill candidate list may be recommended into a located object or input fields of a different application. A selection of the auto-fill content from the auto-fill candidate list may be used to automatically fill out the correlated fields. In response to the communications and/or the auto-fill content, user reaction and feedback may be learned while refining user-screen interaction patterns crossing devices.

Figure 4:
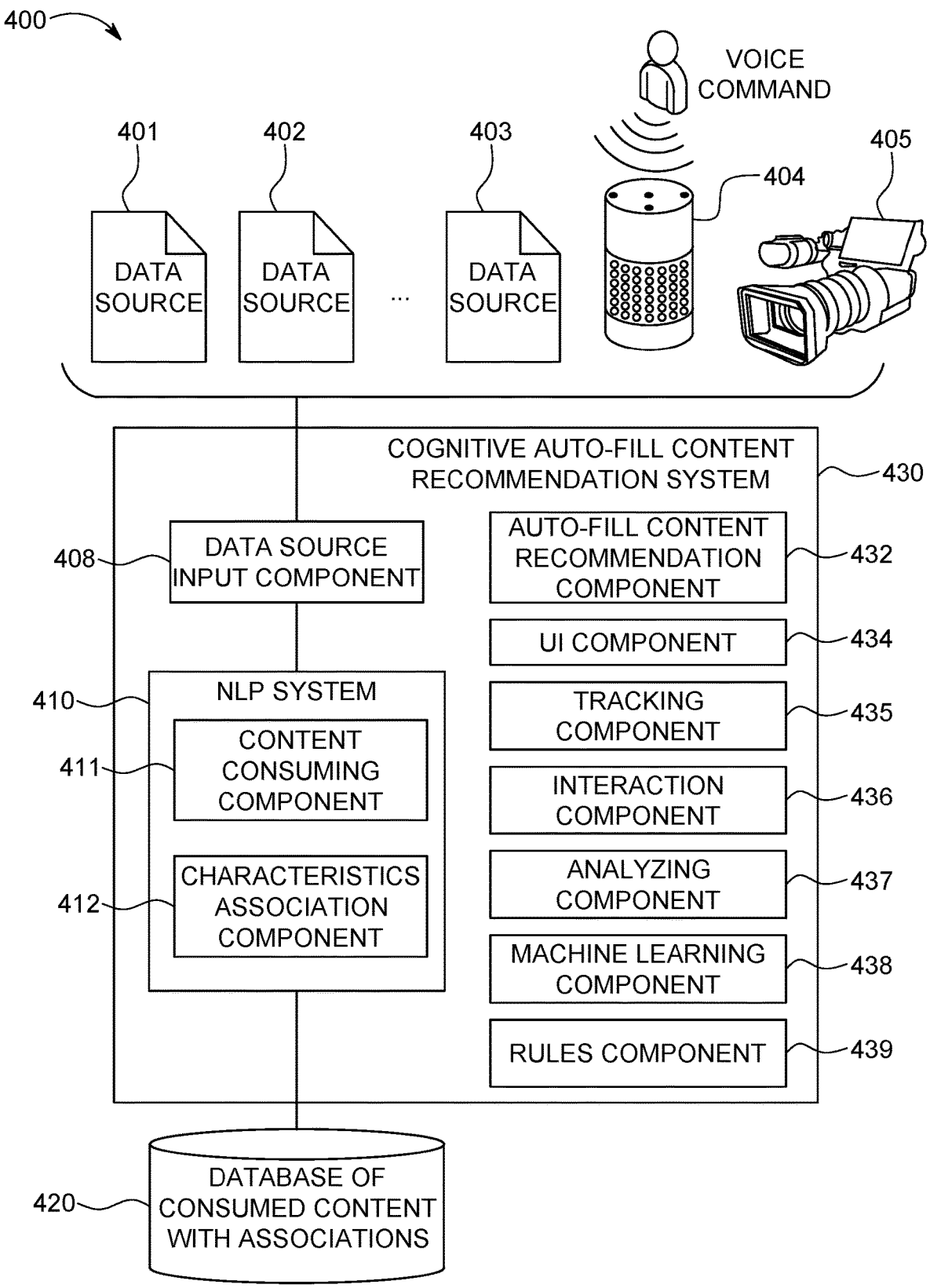
FIG. 4 is a diagram depicting various user hardware and computing components functioning in accordance with aspects of the present invention.

Turning now to FIG. 4, a block diagram of exemplary functionality 400 relating to a cognitive auto-fill content recommendation system is depicted. As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIGS. 1-3. With the foregoing in mind, the module blocks 400 may also be incorporated into various hardware and software components relating to a cognitive auto-fill content recommendation system in accordance with the present invention, such as those described in FIGS. 1-3. Many of the functional blocks 400 may execute as background processes on various components, either in distributed computing components, or on the user device, or elsewhere.

Multiple data sources 401-405 may be provided by one or more different applications and/or computing devices. The data sources 401-405 may be provided as a corpus or group of data sources defined and/or identified. The data sources 401-405 may include, but are not limited to, data sources relating to one or more emails, short message service ("SMS") messages, internet of things (IoT) service, social media data (e.g., a post), online journals, journals, articles, drafts, audio data, image data (e.g., a screen shot of a graphical user interface displaying information), video data, video chatting threads, channels, protocols, formats, and/or other various data sources capable of being processed, published, displayed, interpreted, transcribed, or reduced to text data. The data sources 401-405 may be all of the same type, for example, pages or articles in a wiki or pages of a blog. Alternatively, the data sources 401-405 may be of different types, such as word documents, SMS messages, emails, inputs of one or more internet of things (IoT) devices, chat threads, wikis, web pages, power points, printable document format, or any document capable of being analyzed by a natural language processing system.

In addition to text based documents, other data sources such as audio, video or image sources may also be used. The audio, video, or image sources may be pre-analyzed to extract or transcribe their content for natural language processing, such as converting from audio to text and/or image analysis. For example, a voice command issued by a content contributor may be detected by a voice-activated detection device 404 and record each voice command or communication. The recorded voice command/communication may then be transcribed into text data for natural language processing. As an additional example, a video capturing device 405 (e.g., a camera) may record a video such as, for example, a webinar or meeting where cameras are installed in a room for broadcasting the meeting to remote locations where various intellectual property content contributors may collaborate remotely. The video data captured by the video capturing device 405 may be analyzed and transcribed into images or text data for natural language processing.

The group of data sources 401-405 are consumed for a cognitive auto-fill content recommendation system 430 such as, for example, cognitive auto-fill content recommendation system 430 using natural language processing (NLP) and artificial intelligence (AI) to provide processed content.

In one example, an instance of IBM® Watson® (IBM and Watson are trademarks of International Business Machines Corporation) NLP is used. The instance of Watson is provided and pointed at the group of data sources. The aspects of Watson that the described method and system makes use of are the technologies behind Alchemy Language (Alchemy Language is a trademark of International Business Machines Corporation). However, other NLP technologies or services may be used to provide the processed content as described herein.

The data sources 401-405 may be analyzed by an NLP system 410 to data mine or transcribe relevant information from the content of the data sources 401-405 in order to display the information in a more usable manner and/or provide the information in a more searchable manner. The NLP system 410 may be an instance of an NLP and AI tool such as Watson, which may be provided as a cloud service or as a local service.

The NLP system 410 may consume the multiple data sources 401-405 as selected by using a data source input component 408, including, for example, word docs, emails, short message service ("SMS") messages, social media data (e.g., a post), academic or scientific papers, journals, books, online journals, wikis, web pages, power points, Internet word docs, knowledge centers, anything that the NLP system 410 knows how to understand. This may extend to non-text based documents, by providing pre-analyzing of the content such as audio, image, and/or video to text processing.

The NLP system 410 may include a content consuming component 411 for inputting the data sources 401-405 and running its NLP and AI tools against them, learning the content, such as by using the machine learning component 438. The content consuming component 411 may also mine the content consumed. As the NLP system 410 (including the machine learning component 438) learns different sets of data, a characteristics association component 412 (or "cognitive characteristics association component") may use the artificial intelligence to make cognitive associations or links between data sources 401-405 by determining common concepts, methods, features, similar characteristics, and/or an underlying common topic. More specifically, the NLP system 410 may data mine the data sources 401-405 to identify and extract one or more entities or content contributors associated with concepts, methods, features, similar characteristics, and/or topics/subtopics via the characteristics association component 412.

It should be noted that the NLP system 410 may also include functionality to convert an image or video data of the communications to text data, and/or convert audio data of the communications to text data. In doing so, the NLP system 410 may employ other components, modules, systems, or computer processing operations to covert the various types of data into text data. For example, the analyzing component 437 may determine that type of data (e.g., text data, audio data, video data, image data, etc.). Upon determining the type of data, the analyzing component 437 may covert the various types of data into text data.

Cognition is the mental process of knowing, including aspects such as awareness, perception, reasoning and judgment. An AI system uses artificial reasoning to interpret the data sources 401-405 and extract their topics, ideas, or concepts. The content may not be specifically named or mentioned in the data sources 401-405 and is derived by the AI interpretation.

The learned content of the data sources consumed by the NLP system may be merged into a database 420 or other data storage method of the consumed content with learned concepts, methods, and/or features of the data sources 401-405 providing association between the content referenced to the original data sources 401-405.

In one aspect, the database 420 may be a knowledge domain that may store, maintain, update, and provide data relating to the knowledge domain. In one aspect, the knowledge domain may be an ontology of concepts representing a domain of knowledge such as, for example, learned data, data pattern, behaviors, user interaction patterns, topics, content, or even feedback learned or received using the machine learning component. A thesaurus or ontology may be used as the domain knowledge and may also be used to identify semantic relationships between observed and/or unobserved variables. In one aspect, the term "domain" is a term intended to have its ordinary meaning. In addition, the term "domain" may include an area of expertise for a system or a collection of material, information, content and/or other resources related to a particular subject or subjects. A domain can refer to information related to any particular subject matter or a combination of selected subjects. The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

The digital content of the original data sources 401-405 may remain in the original data sources such as the emails, electronic communications, papers, notes, reports, etc., but the database 420 will have a logical understanding of how the original data sources 401-405 fit together using the power of the AI allowing for the concepts and therefore the associations or mappings between the data sources. In other words, the database 420 may track, identify, and associate all communication threads.

The merging of the data into one database 420 allows the cognitive auto-fill content recommendation system 430 to act like a search engine, but instead of key word searches, it will use an AI method of making cognitive associations between the data sources using the deduced concepts.

The cognitive auto-fill content recommendation system 430 may include a user interface ("UI") component 434 (e.g., an interactive graphical user interface "GUI") providing user interaction with the indexed content for mining and navigation and/or receiving one or more inputs/queries from a user. More, specifically, the user interface component 434 may be in communication with a variety of devices such as, for example, one or more internet of things (IoT) devices and/or one or more wireless communication devices (e.g., cellular telephone 254A, desktop computer 254B, and/or laptop computer 254C, and/or automobile computer system 254N of FIG. 2) for also providing user interaction with communication messages and/or auto-fill content. The wireless communication device may also include a GUI for providing a domain-oriented query functionality such as, for example, an interactive GUI functionality for enabling a user to enter a query in the GUI relating to a domain of interest and an associated objective.

The cognitive auto-fill content recommendation system 430 may also include an auto-fill content recommendation component 432. The auto-fill content recommendation component 432 may use data retrieved directly from one or more data sources or stored in the database 420. The auto-fill content recommendation component 432 may recommend auto-fill content from the communications to automatically fill into a target application. In one aspect, once the NLP system 410 has carried out the linking of the data, the auto-fill content recommendation component 432 may mine the associated concepts, topics, or similar characteristics from the database 420 of the consumed content to recommend auto-fill content from the communications to automatically fill into a target application.

The auto-fill content recommendation component 432 may extract the auto-fill content from the communications based on a plurality of contextual factors. The auto-fill content recommendation component 432 may classify buffered content of the communications according to one or more rules so as to extract the auto-fill content. The auto-fill content recommendation component 432 may also synchronize one or more events of the communications based on chronological order or logical order.

In an additional aspect, the auto-fill content recommendation component 432 may generate a list of auto-fill content and recommend the list of auto-fill content to enable a user to select the auto-fill content from the list of auto-fill content, which may be displayed using the UI component 434. In this way, the UI component enables a user to select the auto-fill content from a list of auto-fill content. Alternatively, the auto-fill content recommendation component 432 may automatically select the auto-fill content from a list of auto-fill content.

Said differently, the auto-fill content recommendation component 432 may locate potential auto-fill objects (e.g., filling objects or inputs of a target application/device) and generate a recommendation candidate list. The auto-fill candidate list may be recommended into the located filling object of a target application/device, and accept a user's selection to fill out correlated fields as input into the filling object of a target application/device.

The cognitive auto-fill content recommendation system 430 may also include a tracking component 435 for monitoring, tracking, tracing, and/or identifying content contributions (e.g., sender of email, text messages, audio/video records, etc.), connections, or relationships between the various communications across different applications and/or devices, which may be maintained in or displayed via the database 420. The tracking component 435 may track the evolution of ideas, topics/subtopics, suggestions, or content that may be discussed in the communications. The tracking component 435 may track conversation contexts from multiple resources (e.g., email, text, voice, and video chatting threads, channels, protocols, and formats) on different applications and/or devices.

The cognitive auto-fill content recommendation system 430 may also include an analyzing component 437 for determining and/or analyzing the various communications. The analyzing component 437 may work in conjunction with the auto-fill content recommendation component 432 for compiling a list of contents to automatically fill one or more target inputs in a target application or device. More specifically, the analyzing component 437 may analyze user-screen interaction (including the chronological order such as, for example, a timeline of the communication and also logical relationships between running applications) according to defined service criteria (auto-fill content rules) and personal characteristics defined in profiles. The analyzer shall be able to determine: 1) the source application and target applications, 2) target fields, target objects, or target sections to auto-fill content in the target application, 3) the objects, contents, and elements that may be selected and copied from the source application to the target application, 4) the objects, contents, and elements that may be proactively filled into recommended target fields, target objects, or target sections of the target application, and/or 5) a selected time period to display (e.g., show) the recommended proactive filled contents. In an additional aspect, the analyzing component 437 may analyze user interaction and reaction patterns on a GUI pertaining to the communications or auto-fill content. The analyzing component 437 may be used to analyze communication and user interaction patterns and reactions to the communications and/or auto-fill content.

In one aspect, the analyzing component 437 may perform one or more various types of calculations or computations.

The calculation or computation operations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

A rules component 439 may also be included in the cognitive auto-fill content recommendation system 430. For example, the rules component 439 may be used to define service criteria and profiles having personal characteristics of users. The rules component 439 may also define one or more rules to auto-fill content from the communications. The rules component 439 may also define policies and rules in view of the contextual factors to determine the content for extraction from the communications and type of auto-fill content.

The cognitive auto-fill content recommendation system 430 may also include the machine learning component 438. The machine learning component 438 may work in conjunction or association with the analyzing component 437. Accordingly, the machine learning component 438 may be used to analyze communication and user behavior, interaction patterns, and reactions to the communications and/or auto-fill content. An interaction component 436 may also be used, in conjunction with the machine learning component 438, to identify and/or learn user reaction to the auto-fill content to refine user-interaction patterns on the target application or the one or more applications or devices.

The machine learning component 438 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
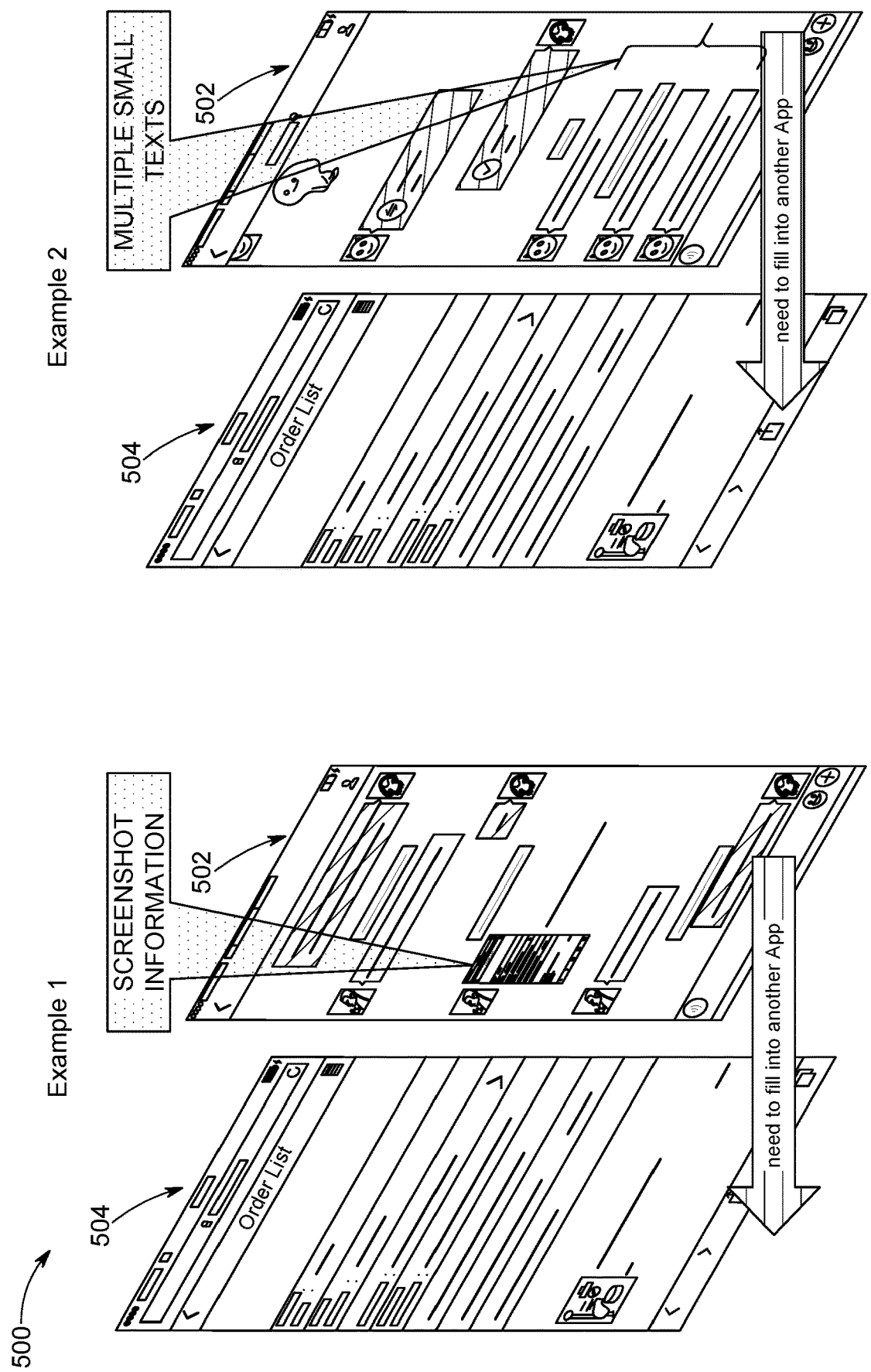
FIG. 5 is a block/flow diagram illustrating certain aspects of functionality according to the present invention.

FIG. 5 is a block/flow diagram 500 illustrating certain aspects of functionality for cognitively recommending auto-fill content using a cognitive auto-fill content recommendation system (see cognitive auto-fill content recommendation system 430 of FIG. 4). In view of FIG. 4 above, consider exemplary examples of graphical user interfaces ("GUI" or "screen shot" of the GUI) 502 and 504. In one aspect, GUI 502 is a GUI of a different application or different device as compared to the target GUI 504.

In the depicted embodiment, example 1 illustrates GUI 502 having a series of text message communications displayed therein. In a selected portion of GUI 502, screenshot information is displayed in the GUI 502. Accordingly, the present invention enables the GUI 502 to recommend to target GUI 504 auto-fill content (e.g., the screenshot) from the communications to automatically fill into a target application that may be displayed in target GUI 504. That is, the screenshot of GUI 502 may be used to auto-fill one or more input fields or input sections of a target application that displays GUI 504. That is, the present invention enables the screenshot message of GUI 502 to be automatically extracted to automatically fill content in target GUI 504 of a target application.

In an additional aspect, example 2 illustrates GUI 502 having a series of text message communications displayed therein. A selected portion of the series of text messages may be merged together to auto-fill content (e.g., content from all or portions of the merged messages) from the communications to automatically fill into the target application that may be in target GUI 504. Accordingly, the present invention enables the GUI 502 to automatically merge multiple messages together so as to auto-fill content in a target application.

Figure 6:
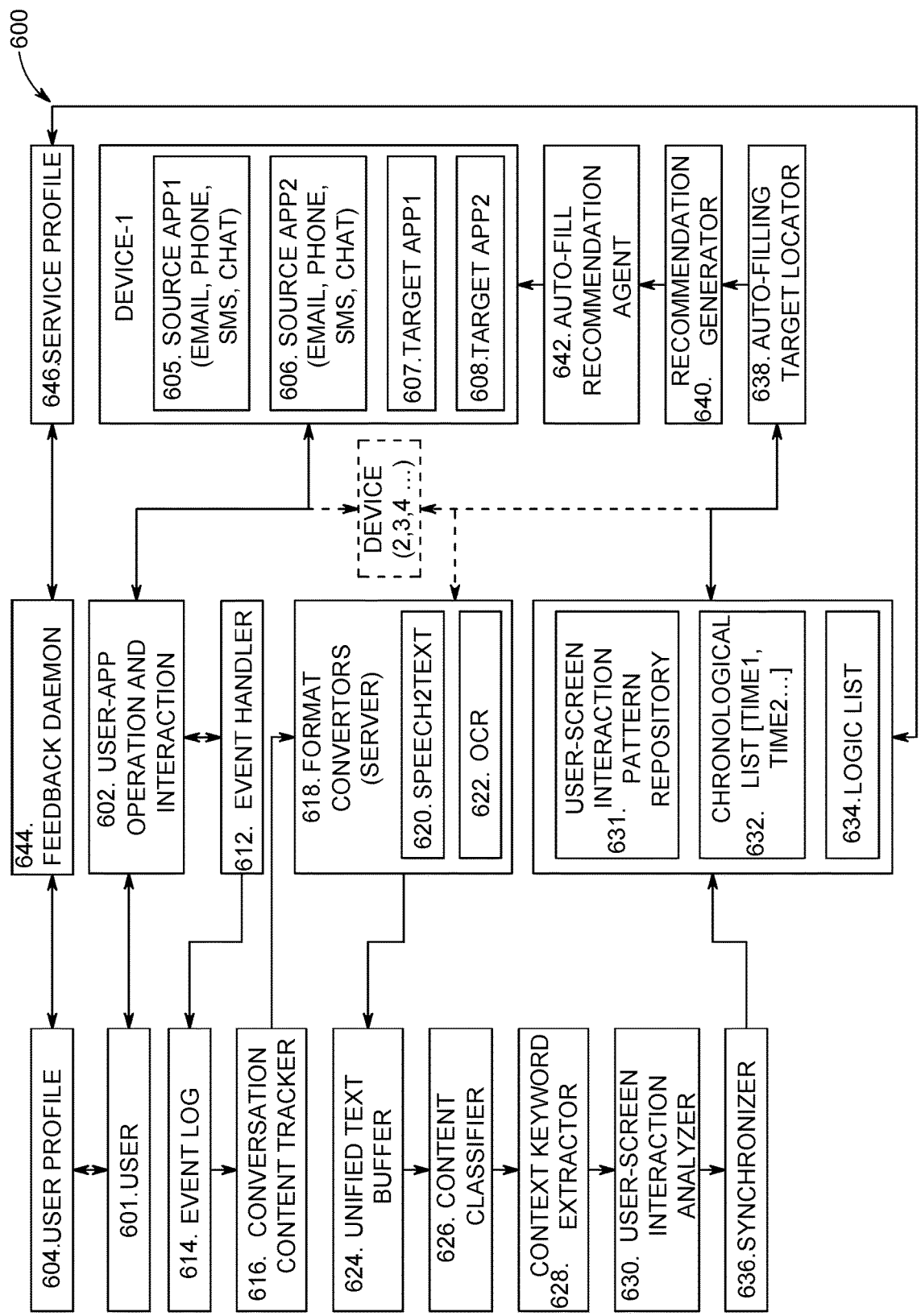
FIG. 6 is a flowchart diagram depicting an exemplary method for cognitively recommending auto-fill content between different applications or devices, in which various aspects of the present invention may be realized.

Turning now to FIG. 6, various blocks of functionality are depicted with arrows designating the blocks' 600 relationships with each other and to show process flow. Additionally, descriptive information is also seen relating each of the functional blocks 600. As will be seen, many of the functional blocks may also be considered "modules" of functionality, in the same descriptive sense as has been previously described in FIGS. 1-5. With the foregoing in mind, the module blocks 600 may also be incorporated into various hardware and software components of a system for cognitive auto-fill content recommendation between different applications or devices in accordance with the present invention such as, for example, within computer system/server 112 of FIG. 1. Many of the functional blocks 600 may execute as background processes on various components, either in distributed computing components, or on the user device, or elsewhere, and generally unaware to the user.

Staring in block 612, an event handler may process and log defined user application operations and interactions (such as events, activities, and conversation contexts, etc.) from multiple communications/messages such as, for example, chat threads, channels, protocols, etc. An event log may be used where the log information in an event log may include launched application names, active windows, active web pages, viewed contents, conversation partners, and the like, as in block 614. A conversation content tracker may track communications (e.g., a conversation) and communication contexts from multiple communications/messages such as, for example, chat threads, channels, protocols, and formats, as in block 616. Moving to block 618, format convertor(s) may be a set of components (e.g., servers) that may be used for converting a detected communication message (e.g., an image, audio, video, etc.) in a source application to a selected format (e.g., a text format) and save the formatted data into a buffer (e.g., a unified text buffer), as in block 624.

For example, a Speech2Text operation may convert audio information to text data, as in block 620, and an optical character recognition ("OCR") operation may convert image input to text data, as in block 622.

At block 626, a content classifier may classify buffered contents into separate useful information ("useful" being defined by a user or learned via machine learning to identify information favorable to a user) according to defined rules in a user profile of block 604. A context keyword extractor may extract context keywords (e.g., time, names, events, subjects, object) so as to generate a correlated event status for identifying the automatic filling of one or more target objects in a target application, as in block 628.

At block 630, a user-screen interaction analyzer may analyze user-screen interaction chronological data (e.g., a timeline) and logic (e.g., operations having a relationship) between running applications according to defined service criteria (e.g., auto-fill rules) and personal characteristics defined in profiles. The "personal characteristics" may be information saved in a user profile. The user profile may include user identifiers ("IDs"), names, cloud-computing accounts, bank information, age, gender, education, accessible WiFi, application access rights, and/or a combination thereof.

In one aspect, in a user's smartphone settings, the user may only allow application "1" and application "2" to access the microphone, and only allow application "3" to access internet from a wireless communication data network. Therefore, the system may be unable to retrieve any source data from the microphone in application "3", and it is also unable to provide service for application "1" and application "2" in the wireless communication network. The user-screen interaction timeline may be an interaction event list ordered in chronological order. For instance, in a chatting session between user-1 and user-2 in application "1", 1) user-2 asked user-1 to provide David's contact address; 2) user-1 switched his screen and opened his contact book (application "2"); 3) user-1 found David's address in application "2"; 4) user-1 switched application "2" to application "1." Then the timeline on user-1 side may be: time-1 (user-1 needs to find David's address); time-2 (screen switch from application "1" to application "2"); time-3 (found David's address); time-4 (screen switch from application "2" to application "1"). It should be noted that one or more relationships may be inferred between entries (e.g., values) based on, for example, chronology, and/or extrapolating one or more new values based on a cognitive model (e.g., an account ID on one computer that has been changed may not necessarily prepopulate on an older mobile device upon an account ID on a first computer being changed.

The user-screen interaction analyzer shall be able to determine: 1) a source application and one or more target applications, 2) target fields, target objects, or target sections to auto-fill content in the target application, 3) the objects, contents, and elements that may be selected and copied from the source application to the target application, 4) the objects, contents, and elements that may be proactively filled into recommended target fields, target objects, or target sections of the target application, and/or 5) a selected time period to display (e.g., show) the recommended proactive filled contents.

Moving to block 636, a synchronizer may update and synchronize the status of correlated events. The event status may include more than one dimension such as, for example, chronological order and logic order. For example, the synchronizer may update and synchronize a user-screen interaction pattern repository, chronological list and/or a logical list of blocks 631, 632, and 634. The chronological list may be a list of events ordered based on time (e.g. $Time_1$, $Time_2 \ldots Time_N$). The logic list may be a list of events ordered based on a logical relationship such as, for example: 1) receive a request, 2) identify source application and field, 3) find information in the source application and field, and 4) copy the information from the source application and field. The user-screen interaction pattern repository may be a centralized database to store the patterns of interaction for serving multiple devices such as, for example, device 1, device 2, device 3, device 4 and so on.

In one aspect, each device such as, for example, device 1 may include a first source application, as in block 605, a second source application, as in block 606, a first target application, as in block 607, and/or a second target application, as in block 608.

Moving to block 638, an auto-filling target locator may locate potential filling objects or input fields of a target application and also assist with screening and analyzing where a "blank space" may be identified in a communication. A recommendation generator may generate one or more recommended auto-fill candidate lists according to target potential filling objects, as in block 640. Moving to block 642, an auto-fill recommendation agent may recommend auto-fill candidate lists into the located objects and accept a user's selection to fill out the correlated fields in the target application. A service profile may be used, as in block 646. The service profile may be a file for including service criteria (e.g., focused application types, fields, conversion types, auto filled types) such as, for example, an address, name, phone number, and the like. In one aspect, the service criteria may be a set of rules which can be used by other modules (e.g., User-screen Interaction Analyzer). The User-screen Interaction Analyzer may determine, identify, and/or know the types of applications that may be selected as source applications and which applications can be selected as a target application(s). Therefore, the service criteria can be defined as follows. 1) Focused source application types may be, for example, an email reader and/or personal contact manager. 2) The SMS automated filled application type may be, for example, social media applications and/or email readers. Also, the system may need to know which fields on those applications shall be focused. The criteria shall be defined as name, address, email address, and telephone number.

A user profile may also be used, as in block 604. The user profile may be a file for including personal characteristics (e.g., a native language, preferred language, etc.) for configuring an operation for auto-fill content recommendation service. A feedback daemon may be used for learning user reaction and feedback and refining user-screen interaction patterns crossing devices, as in block 644.

Figure 7A:
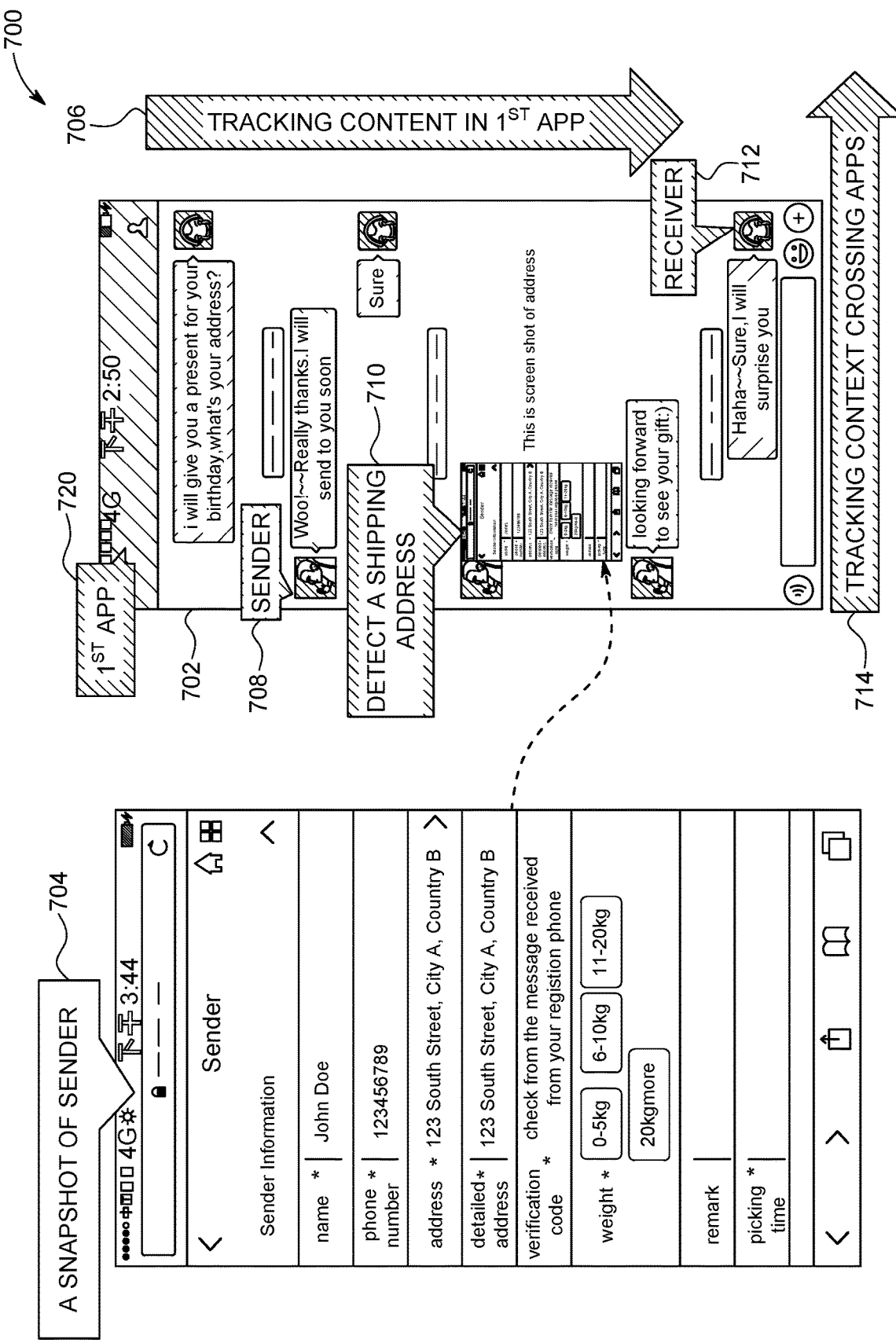
FIGS. 7A-7B are block/flow diagrams illustrating certain aspects of functionality according to the present invention.
Figure 7B:
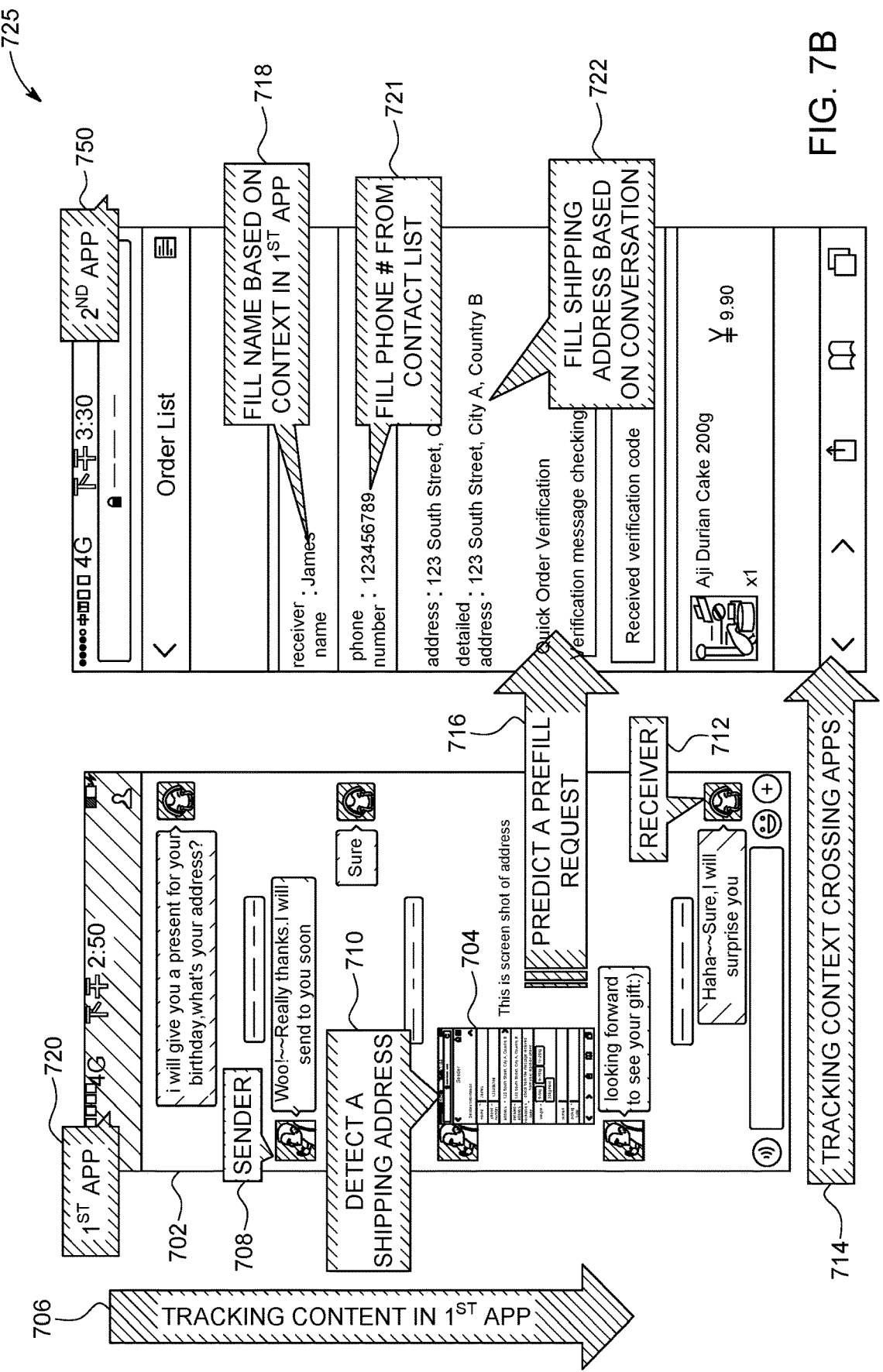

Turning now to FIGS. 7A-7B, block/flow diagrams 700 and 725 illustrate cognitively recommending auto-fill content between different applications or devices. Aspects of FIGS. 7A-7B may also be incorporated into various hardware and software components of a system for cognitive auto-fill content recommendation between different applications or devices in accordance with the present invention such as, for example, within computer system/server 112 of FIG. 1.

Turning now to FIG. 7A, an example illustrates GUI 702 displaying a series of text message communications and a screenshot of a sender's 708 screen of the GUI 702 displayed therein. In one aspect, GUI 702 may display a first application 720 depicting communication messages (e.g., text messages) between a sender 708 and a receiver 712. The sender 708 may send to the receiver 712 a screenshot information displayed in the GUI 702. The content of the communication 706 may be tracked in the first application 720 ("1$^{st}$ App"). A shipping address may be detected in the screenshot 704 of a sender's 708 screen now displayed in the GUI 702, as in block 710. A context of communications may be tracked for one or more source applications and one or more target applications, as in block 714.

Turning now to FIG. 7B, the GUI 702 may now predict an auto-fill content request, as in block 716. That is, a prefill request may be predicted. On a second application 750 (e.g., a target application), the predicted, auto-fill request may fill in a name associated with context of a first application 720 (e.g., a source application), as in block 718. A phone number may also be filled from a list of communications and/or audio text (e.g., a contact list), as in block 721. A shipping address may be auto-filled based on the communication, as in block 722.

Figure 8:
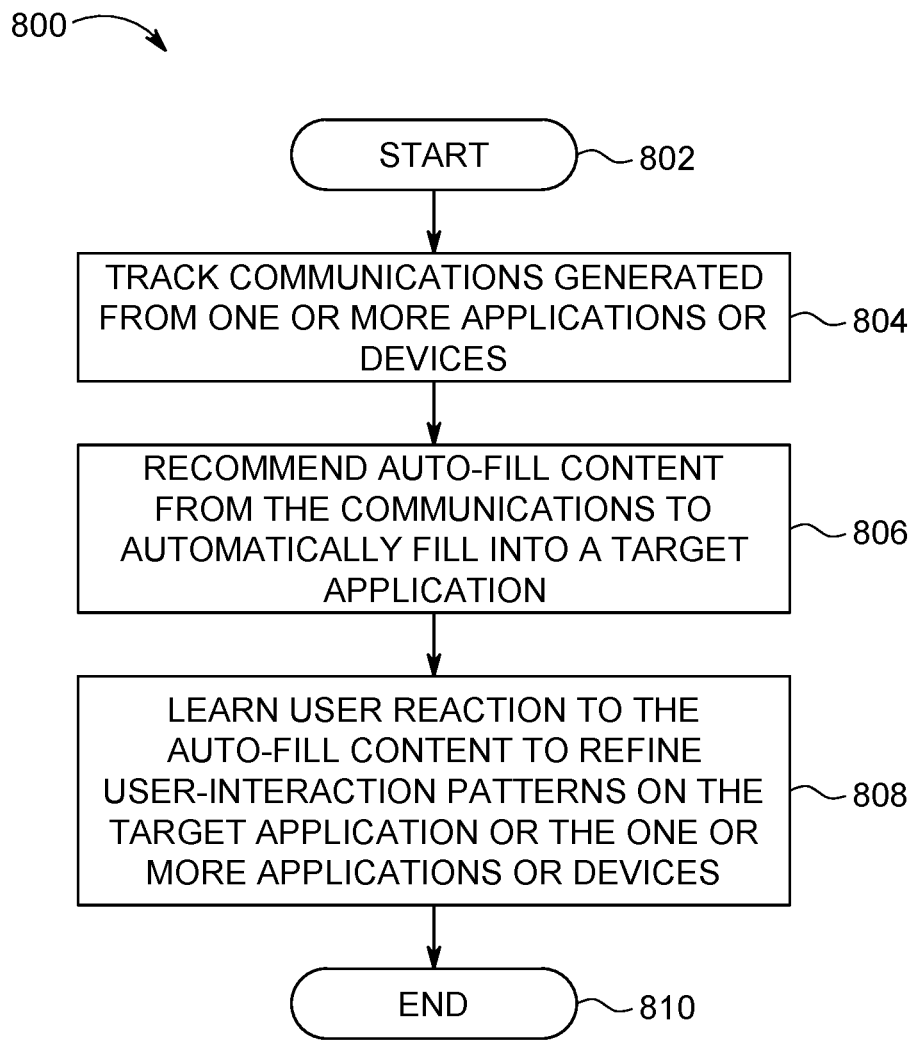
FIG. 8 is an additional flowchart diagram depicting an additional exemplary method for cognitively recommending auto-fill content between different applications or devices, again in which various aspects of the present invention may be realized.

FIG. 8 is an additional flowchart diagram depicting an additional exemplary method for cognitively recommending auto-fill content between different applications or devices, again in which various aspects of the present invention may be realized. The functionality 800 may be implemented as a method executed as instructions on a machine, where the instructions are included on at least one computer readable medium or one non-transitory machine-readable storage medium. The functionality 800 may start in block 802. One or more communications generated from one or more applications or devices may be tracked, as in block 804. Auto-fill content(s) from the communications may be recommended to automatically fill into a target application, as in block 806. A user reaction to the auto-fill content may be learned to refine user-interaction patterns on the target application or the one or more applications or devices, as in block 808. The functionality 800 may end, as in block 810.

In one aspect, in conjunction with and/or as part of at least one block of FIG. 8, the operations of method 800 may include each of the following. The operations of method 800 may extract the auto-fill content from the communications based on a plurality of contextual factors. The operations of method 800 may process the communications using natural language processing (NLP); convert an image or video data of the communications to text data; and/or convert audio data of the communications to text data. One or more events of the communications may be synchronized based on chronological order or logical order.

The operations of method 800 may recommend a list of auto-fill content to enable a user to select the auto-fill content from the list of auto-fill content. A machine learning mechanism may be initialized and use feedback information to learn the user reaction to the auto-fill content and the user-interaction patterns.

In an additional aspect, the operations of method 800 may extract the content from a screenshot of the communications for automatically filling the auto-fill content into the target application, and/or merge the communications to generate the auto-fill content for automatically filling the auto-fill content into the target application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for cognitively recommending auto-fill content by a processor, comprising:
    tracking communications generated from one or more applications or devices;
    recommending auto-fill content from the communications to automatically fill into a target application; wherein recommending the auto-fill content further includes extracting the content from a captured screenshot of the communications generated from the one or more applications or devices such that the screenshot captures a virtual image of electronic conversations between users comprising the communications, and automatically filling the auto-fill content into the target application; and
    learning user reaction to the auto-fill content to refine user-interaction patterns on the target application or the one or more applications or devices.

2. The method of claim 1, further including extracting the auto-fill content from the communications based on a plurality of contextual factors.

3. The method of claim 1, further including:
    processing the communications using natural language processing (NLP);
    converting an image or video data of the communications to text data; or
    converting audio data of the communications to text data.

4. The method of claim 1, further including synchronizing one or more events of the communications based on chronological order or logical order.

5. The method of claim 1, further including:
    recommending a list of auto-fill content to enable a user to select the auto-fill content from the list of auto-fill content; and
    selecting the auto-fill content from a list of auto-fill content.

6. The method of claim 1, further including initializing a machine learning mechanism using feedback information to learn the user reaction to the auto-fill content and the user-interaction patterns.

7. The method of claim 1, further including:
    merging the communications to generate the auto-fill content for automatically filling the auto-fill content into the target application; or
    inferring one or more relationships between values or extrapolating one or more new values based on a cognitive model.

8. A system for cognitively recommending auto-fill content, comprising:
    one or more computers with executable instructions that when executed cause the system to:
        track communications generated from one or more applications or devices;
        recommend auto-fill content from the communications to automatically fill into a target application; wherein recommending the auto-fill content further includes extracting the content from a captured screenshot of the communications generated from the one or more applications or devices such that the screenshot captures a virtual image of electronic conversations between users comprising the communications, and automatically filling the auto-fill content into the target application; and
        learn user reaction to the auto-fill content to refine user-interaction patterns on the target application or the one or more applications or devices.

9. The system of claim 8, wherein the executable instructions further extract the auto-fill content from the communications based on a plurality of contextual factors.

10. The system of claim 8, wherein the executable instructions further:
    process the communications using natural language processing (NLP);
    convert an image or video data of the communications to text data; or
    convert audio data of the communications to text data.

11. The system of claim 8, wherein the executable instructions further synchronize one or more events of the communications based on chronological order or logical order.

12. The system of claim 8, wherein the executable instructions further:
  recommend a list of auto-fill content to enable a user to select the auto-fill content from the list of auto-fill content; and
  select the auto-fill content from a list of auto-fill content.

13. The system of claim 8, wherein the executable instructions further initialize a machine learning mechanism using feedback information to learn the user reaction to the auto-fill content and the user-interaction patterns.

14. The system of claim 8, wherein the executable instructions further:
  merge the communications to generate the auto-fill content for automatically filling the auto-fill content into the target application; or
  infer one or more relationships between values or extrapolating one or more new values based on a cognitive model.

15. A computer program product for facilitating communications of a user by a processor, the computer program product comprising a non-transitory computer-readable storage medium having computer-readable program code portions stored therein, the computer-readable program code portions comprising:
  an executable portion that tracks communications generated from one or more applications or devices;
  an executable portion that recommends auto-fill content from the communications to automatically fill into a target application; wherein recommending the auto-fill content further includes extracting the content from a captured screenshot of the communications generated from the one or more applications or devices such that the screenshot captures a virtual image of electronic conversations between users comprising the communications, and automatically filling the auto-fill content into the target application; and
  an executable portion that learns user reaction to the auto-fill content to refine user-interaction patterns on the target application or the one or more applications or devices.

16. The computer program product of claim 15, further including an executable portion that:
  extracts the auto-fill content from the communications based on a plurality of contextual factors;
  merges the communications to generate the auto-fill content for automatically filling the auto-fill content into the target application; or
  infers one or more relationships between values or extrapolating one or more new values based on a cognitive model.

17. The computer program product of claim 15, further including an executable portion that:
  processes the communications using natural language processing (NLP);
  converts an image or video data of the communications to text data; or
  converts audio data of the communications to text data.

18. The computer program product of claim 15, further including an executable portion that synchronizes one or more events of the communications based on chronological order or logical order.

19. The computer program product of claim 15, further including an executable portion that:
  recommends a list of auto-fill content to enable a user to select the auto-fill content from the list of auto-fill content; and
  selects the auto-fill content from a list of auto-fill content.

20. The computer program product of claim 15, further including an executable portion that initializes a machine learning mechanism using feedback information to learn the user reaction to the auto-fill content and the user-interaction patterns.

* * * * *